(12) United States Patent
Hironaka

(10) Patent No.: US 6,959,907 B2
(45) Date of Patent: Nov. 1, 2005

(54) NORMALLY CLOSED SOLENOID-OPERATED VALVE

(75) Inventor: Hideharu Hironaka, Anjo (JP)

(73) Assignee: Advics Co., Ltd., Kariya (JP)

( * ) Notice: Subject to any disclaimer, the term of this patent is extended or adjusted under 35 U.S.C. 154(b) by 43 days.

(21) Appl. No.: 10/720,518

(22) Filed: Nov. 25, 2003

(65) Prior Publication Data
US 2004/0104371 A1 Jun. 3, 2004

(30) Foreign Application Priority Data
Nov. 29, 2002 (JP) .............................. 2002-347509

(51) Int. Cl.[7] .............................................. F16K 31/06
(52) U.S. Cl. ....................... 251/50; 251/54; 251/129.07
(58) Field of Search ....................... 251/129.07, 129.15, 251/282, 50, 48, 54

(56) References Cited

U.S. PATENT DOCUMENTS

| | | | |
|---|---|---|---|
| 3,523,676 A | * 8/1970 | Barker | 251/129.05 |
| 3,666,231 A | * 5/1972 | Parodi et al. | 251/129.1 |
| 4,634,096 A | * 1/1987 | Hara | 251/50 |
| 4,852,853 A | * 8/1989 | Toshio et al. | 251/129.07 |
| 5,601,275 A | 2/1997 | Hironaka | |
| 5,722,633 A | * 3/1998 | Goossens et al. | 251/48 |
| 5,918,635 A | * 7/1999 | Wang et al. | 251/129.15 |
| 6,021,997 A | * 2/2000 | Hell | 251/129.07 |

* cited by examiner

Primary Examiner—John Bastianelli
(74) Attorney, Agent, or Firm—Buchanan Ingersoll PC

(57) ABSTRACT

A normally closed solenoid-operated valve is composed of a stationary element provided at one end of a stationary sleeve, a movable element slidably inserted in the sleeve to face the stationary element and provided at an external surface thereof with a communication groove which axially extends between the opposite ends thereof for permitting the flow of the operating fluid, and an electromagnetic coil for exciting the stationary element and the movable element. A damper chamber is defined by an annular shim provided between the lower end surface of the stationary element and the top surface of the movable element. When the damper chamber is closed by the lower end surface of the stationary element and the top surface of the movable element, a dent groove makes the damper chamber communicate with the communication groove.

7 Claims, 3 Drawing Sheets

NORMALLY CLOSED SOLENOID-OPERATED VALVE

INCORPORATION BY REFERENCE

This application is based on and claims priority under 35 U.S.C. sctn. 119 with respect to Japanese Application No. 2002-347509 filed on Nov. 29, 2002, the entire content of which is incorporated herein by reference.

BACKGROUND OF THE INVENTION

1. Field of the Invention

The present invention relates to a normally closed solenoid-operated valve for controlling the flow of fluid such as hydraulic oil or the like in response to an electric command applied to an electromagnetic coil which excites the solenoid-operated valve.

2. Discussion of the Related Art

Heretofore, as normally closed solenoid-operated valves of this type, there has been known one described in the U.S. Pat. No. 5,601,275 to the inventor of the present application. The known valve is provided with a cylindrical sleeve, a stationary element provided at one end of the cylindrical sleeve, a movable element inserted slidably within the sleeve to move relative to the stationary element, and an electromagnetic coil for exciting the stationary element and the movable element. On the external surface of the movable element, there are formed communication grooves, which axially extend between the both ends of the movable element for permitting the flow of operating fluid therethrough.

Further, in the known solenoid-operated valve, a damper chamber and a valve chamber are formed at the axial opposite ends of the movable element, and a sealing member is provided on the external wall surface. At a part of the circumferential surface of the sealing member, a V-groove is formed, by which a throttle passage is constituted to make the valve chamber and the damper chamber communicate with each other.

In the aforementioned solenoid-operated valve, the valve chamber and the damper chamber are in communication only through the fixed throttle passage. Thus, as shown by the broken line in FIG. 4, the throttle area remains invariable or constant regardless of the movement of the movable element, i.e., regardless of whether the movable element comes close to the stationary element or goes away therefrom. This causes a damping effect to act over the entire area in which the movable element (valve member) moves. As a result, a delay takes place in the operation response of the solenoid-operated valve. On the contrary, if preference is taken to the operation responsiveness of the solenoid-operated valve, a problem would arise in that a sufficient damping effect cannot be obtained so that the operation noise cannot be diminished satisfactorily. Further, the use of the sealing member raises another problem in respect of increasing the manufacturing cost.

SUMMARY OF THE INVENTION

Accordingly, it is a primary object of the present invention to provide an improved solenoid-operated valve which is inexpensive and capable of effectively restraining the operation noise accompanying the open/close operation thereof and of preventing the operation delay.

Briefly, in a normally closed solenoid-operated valve according to the present invention, a stationary element is provided at one end of a stationary sleeve, a movable element is slidably inserted in the sleeve to face the stationary element and is provided at an external surface thereof with a communication groove which axially extends between axial opposite ends thereof for permitting the flow of operating fluid, and an electromagnetic coil is provided for exciting the stationary element and the movable element. A closed wall is provided on at least one of a stationary element end surface facing the movable element of the stationary element and a movable element end surface facing the stationary element of the movable element for defining a damper chamber therein. A fixed throttle is formed for making the damper chamber to communicate with the communication groove when the stationary element end surface and the movable element end surface closes the damper chamber as a result of the movable element excited by the electromagnetic coil being moved toward the stationary element.

With this configuration, when the movable element excited by the electromagnetic coil is moved to come close to the stationary element, the operating fluid within the damper chamber is discharged into the communication groove by way of a clearance between the stationary element end surface or the movable element end surface and the closed wall as well as by way of the fixed throttle. When the movable element is brought into contact with the stationary element, the damper chamber is closed by the stationary element end surface and the movable element end surface, in which state the damper chamber remains to communicate with the communication groove through the fixed throttle. In this way, when the movable element is coming close to the stationary element, the path area which makes the damper chamber communicate with the communication groove is decreased thereby to increase the throttle resistance and to decrease the moving speed of the movable element as the same comes close to the stationary element. Thus, the operation noise which is generated when the movable element is brought into contact with the stationary element can be sufficiently diminished. Further, when the movable element is far from the stationary element, the clearance is kept large between the stationary element end surface or the movable element end surface and the closed wall. Thus the operating fluid within the damper chamber is able to be discharged therefrom and charged thereinto through the clearance without being substantially throttled, so that the movable element can move at a high responsiveness. Accordingly, it can be realized to provide a solenoid-operated valve which is inexpensive and which is capable of effectively restraining the operation noise brought about by the open/close operation thereof without the addition of any sealing member as used in the prior art solenoid-operated valve, and also capable of preventing the occurrence of the delay in response.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS (First Embodiment)

Figure 1:
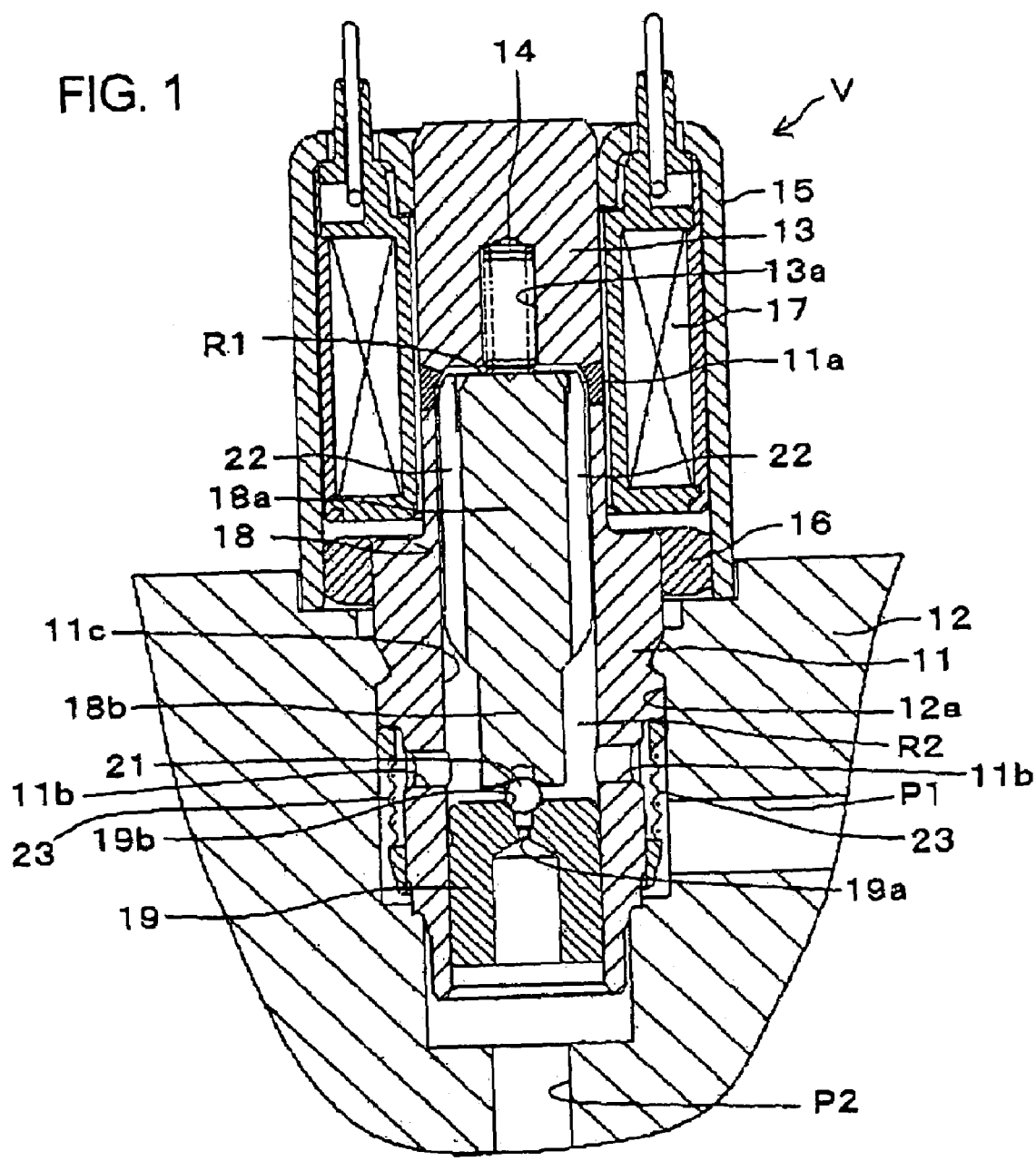
FIG. 1 is a longitudinal sectional view of a normally closed solenoid-operated valve in the first embodiment according to the present invention.

Hereinafter, a normally closed solenoid-operated valve in the first embodiment according to the present invention will be described with reference to FIGS. 1 to 4. FIG. 1 is a longitudinal section showing the normally closed solenoid-operated valve.

As shown in FIG. 1, the solenoid-operated valve V of an open/close type is provided with a sleeve 11 formed cylindrically. The lower end portion of the sleeve 11 is inserted into an installation hole 12a provided in a valve body 12 and is fluid-tightly secured thereto by caulking. The upper portion of the sleeve 11 is protruded from the valve body 12 and is provided at its upper end portion with a stationary element 13 of a cylindrical shape. The stationary element 13 is provided coaxially and bodily with the sleeve 11 and has the same diameter as the upper portion of the sleeve 11. A non-magnetic material 11a is interposed at the boundary portion between the stationary element 13 and the sleeve 11. An axial hole 13a is formed in the center of the stationary element 13 from the lower end thereof and contains a compression spring 14 therein.

An almost cylindrical yoke 15 is secured to the circumferential surface of the stationary element 13 and covers the stationary element 13 and the protruding portion of the sleeve 11 (i.e., the upper portion of the sleeve 11). The upper end portion of the stationary element 13 is fixedly fit in the upper opening portion of the yoke 15. The lower end of the yoke 15 extends down to the installation hole 12a, and a ring 16 is tightly fit between the internal wall of the lower opening end of the yoke 15 and the external surface of the sleeve 11. An electromagnetic coil 17 is provided inside the yoke 15 in coaxial alignment with the sleeve 11 for covering the upper portion of the sleeve 11. The electromagnetic coil 17 is secured to the yoke 15.

The sleeve 11, the stationary element 13, the yoke. 15, the ring 16 and a movable element 18 referred to later are made of magnetic materials. When electric current is applied to the electromagnetic coil 17, a magnetic path is formed around the electromagnetic coil 17 to go through the stationary element 13, the yoke 15, the ring 16 and the sleeve 11, whereby the stationary element 13 and the movable element 18 are excited.

A valve seat member 19 is tightly fit in the lower end portion of an axial hole 11c of the sleeve 11, and the movable element 18 is slidably inserted in the axial hole 11c between the valve seat member 19 and the stationary element 13 with itself facing the stationary element 13. The valve seat member 19 is formed with a valve hole 19a in coaxial alignment therewith. The valve hole 19a is formed with a valve seat 19b at its upper opening edge. The lower end opening of the valve hole 19a faces onto an outlet passage P2 which opens to the bottom of the installation hole 12a.

The movable element 18 is formed with a large diameter portion 18a and a small diameter portion 18b, which is formed at the lower portion of the large diameter portion 18a bodily and coaxially with the same. The large diameter portion 18a is in abutting engagement at its upper surface with the lower end of the compression spring 14, so that the movable element 18 is urged by the compression spring 14 downward as viewed in FIG. 1, i.e., in the direction of closing the valve. A valve member 21 in the form of a ball is provided bodily on the lower end of the small diameter portion 18b and is movable together with the movable element 18. That is, when no electric current is being applied to the electromagnetic coil 17, the movable element 18 is kept urged by the compression spring 14 downward, so that the valve member 21 remains in abutment with the valve seat 19b thereby to close the valve hole 19a, When electric current is applied to the electromagnetic coil 17, on the contrary, the movable member 18 is moved toward the stationary element 13 against the compression spring 14, so that the valve member 21 departs from the valve seat 19b to open the valve hole 19a.

Figure 2:
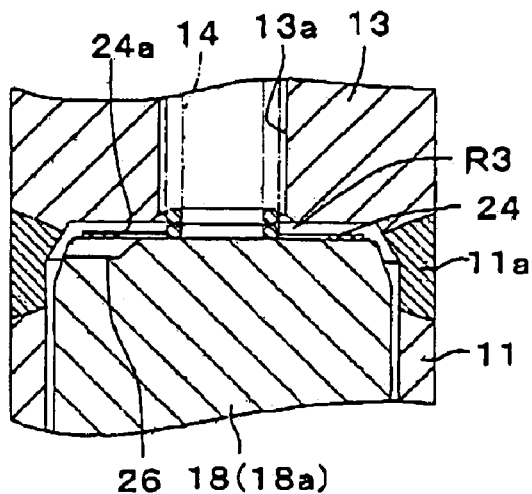
FIG. 2 is an enlarged, fragmentary sectional view of a damper chamber shown in FIG. 1.

When no electric current is being applied to the electromagnetic coil 17, as shown in FIGS. 1 and 2, a predetermined clearance is provided between the upper end surface of the large diameter portion 18a of the movable element 18 and the lower end surface of the stationary element 13. A fluid chamber R1 is defined by the clearance, the axial hole 11c of the sleeve 11 and an annular shim 24 referred to later. It is to be noted that the clearance corresponds to the operating stroke length of the movable element 18.

A valve chamber R2 is defined by the small diameter portion 18b of the movable element 18, the internal wall of the sleeve 11 and the valve member 19. A pair of diametrically opposite communication grooves 22, 22 are provided on the external wall surface of the large diameter portion 18a of the movable element 18 to extend in the axial direction for permitting the operating fluid to flow between the fluid chamber R1 and the valve chamber R2.

Figure 3:
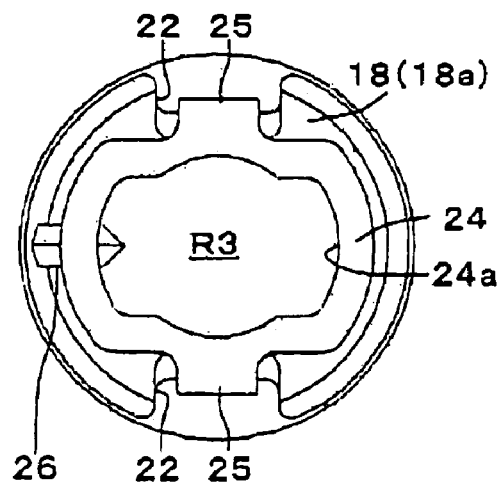
FIG. 3 is an enlarged plan view of a movable element shown in FIG. 1.
Figure 4:
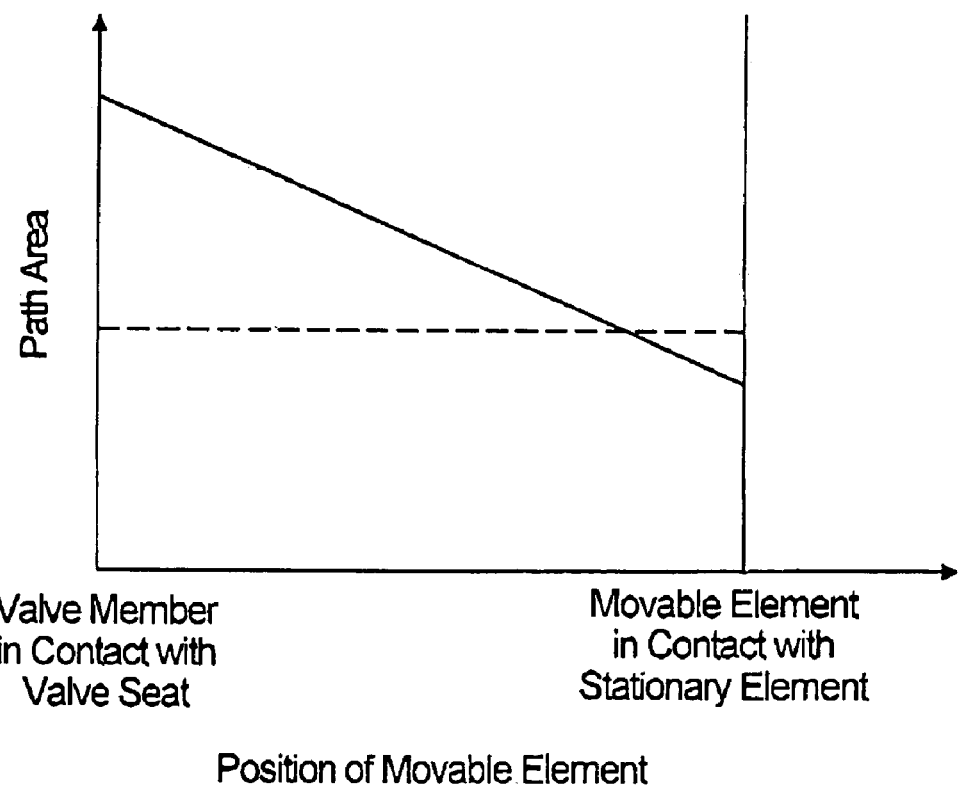
FIG. 4 is a graph showing the relation between the position of the movable element and the area of a communication passage.

The annular shim 24 constituting a closed wall is attached to the top surface of the large diameter portion 18a of the movable member 18. As best shown in FIG. 3, the annular shim 24 takes the form of generally oval and is placed thereon not to overlap the upper end openings of the communication grooves 22, 22 provided on the movable element 18. The annular shim 24 is provided with a pair of engaging claws 25, 25, which are engaged respectively with the communication grooves 22, 22 to hold the annular shim 24 on the movable element 18. The annular shim 24 defines a damper chamber R3 between the lower end surface of the stationary element 13 and the movable element 18. Thus, at the upper and lower portions in the axial hole 11c of the sleeve 11, the damper chamber R3 and the valve chamber R2 are defined with the movable element 18 therebetween.

When the electromagnetic coil 17 is brought into the state of excitation, the movable element 18 is moved upward to come close to the stationary element 13. Thus; the operating fluid within the damper chamber R3 is discharged into the valve chamber R2 through the fluid chamber R1 and then, the pair of communication grooves 22, 22; When the electromagnetic coil 17 is brought into the state of non-excitation, on the other hand, the movable element 18 is moved downward to depart from the stationary element 13, whereby that the operating fluid within the valve chamber R2 is charged into the damper chamber R3 through the pair of communication grooves 22, 22 and then the fluid chamber R1.

The sleeve 11 is provided with communication holes 11$b$ to extend radially and is also provided with a filter attached to the circumferential wall surface of its lower portion. An inlet passage P1 is formed in the valve body 12 to extend toward the lower portion of the sleeve 11 in the radial direction of the sleeve 11. The valve chamber R2 is in communication with the inlet passage P1 through the communication holes 11$b$ and the filter 23 on one hand and with the outlet passage P2 through the valve hole 19$a$ on the other hand.

As shown in FIG. 3, a dent groove 26 serving as a fixed throttle is formed to radially extend to the circumferential end wall at a portion which is of the, top circumferential edge portion and at which the communication grooves 22 are not formed. Thus, when the movable element 18 is excited by the electromagnetic coil 17 thereby to move toward the stationary element 13, the damper chamber R3 is closed by the lower end surface of the stationary element 13 and the annular shim 24 attached to the top surface of the movable element 18, in which state the damper chamber R3 remains in communication with the communication grooves 22 through the dent groove 26 and the clearance of the fluid chamber R1 which remains formed around the top circumferential portion of the movable element 18 at that time.

The radial length of the dent groove 26 is set longer than the radial width of the annular shim 24, and the inner end of the dent groove 26 extends inside beyond the internal surface of the annular shim 24. Further, the dent groove 26 is triangle in cross-section, whose area is set favorably to that corresponding to $\phi$0.4 mm (i.e., a hole of 0.4 millimeters in diameter). The cross-section of the dent groove 26 is not limited to triangle, but it may be rectangular, semicircular or the like.

In the normally closed solenoid-operated valve as constructed above, when the movable element 18 excited by the electromagnetic coil 17 is moved to come close to the stationary element 13, the operating fluid within the damper chamber R3 is discharged into the communication grooves 22 by way of an annular variable throttle and the dent groove 26 as fixed throttle. The annular variable throttle defined at this time has a path area of (h×l) which is made by multiplying the circumferential length (l) of the internal wall surface 24$a$ of the annular shim 24 with the clearance (h) between the lower end surface of the stationary element 13 and the annular shim 24 as closed wall. As understood from the graph shown in FIG. 4, as the movable element 18 comes close to the stationary element 13, the variable throttle decreases its path area thereby to increase its throttle resistance. Further, when the annular shim 24 provided on the movable element 18 is brought into contact with the stationary element 13, the damper chamber R3 is closed by the lower end surface of the stationary element 13 and the top surface of the movable element 18, in which state the damper chamber R3 remains to communicate with the communication grooves 22 only through the dent groove 26.

As understood from the foregoing description, in this particular first embodiment, as the movable element 18 comes close to the stationary element 13, the path area which makes the axial opposite ends of the movable element 18 communicate with each other is decreased to increase the throttle resistance and the moving speed of the movable element 18 is reduced. Thus, the operation noise which is generated when the movable element 18 is brought into contact with the stationary element 13 can be sufficiently diminished. Further, when the movable element 18 is far from the stationary element 13, the clearance (h) between the lower end surface of the stationary element 13 and the annular shim 24 is large, which enables the operating fluid within the damper chamber R3 to be discharged therefrom and charged thereinto without being substantially throttled, so that the movable element 18 can move at a high responsiveness. Accordingly, it can be realized to provide a solenoid-operated valve which is inexpensive and which is capable of, without any sealing member to be added as used in the prior art solenoid-operated valve, effectively restraining the operation noise accompanying the open/shut operation thereof and preventing the delay in response from occurring.

Although in the foregoing embodiment, the dent groove 26 is provided on the top surface of the movable element 18, it may be provided on each of the top surface of the movable element 18 and the lower end surface of the stationary element 13. Further, although in the foregoing embodiment, the annular shim 24 is attached to the movable element 18, it may be attached to the stationary element 13. In this modified case, the operating fluid within the damper chamber R3 is discharged into the communication grooves 22 through a so-called annular variable throttle which is defined by the top surface of the movable element 18 and the annular shim 24 as a closed wall as well as through the dent groove 26.

(Second Embodiment)

Next, the second embodiment according to the present invention will be described with reference to FIGS. 5 and 6. The same elements as those in the first embodiment are given the same reference numerals and therefore, are omitted from further description for the sake of brevity.

In the foregoing first embodiment, the annular shim 24 is interposed between the lower end surface of the stationary element 13 and the top surface of the movable element 18, and the dent groove 26 is provided on the top surface of the movable element 18. Further, the damper chamber R3 is defined using the annular shim 24 between the lower end surface of the stationary element 13 and the top surface of the movable element 18, and the fixed throttle is constituted in the form of the dent groove 26. In place of these configurations, in the second embodiment, as shown in FIGS. 5 and 6, an annular shim 124 is interposed between the lower end surface of the stationary element 13 and the top surface of the movable element 18, a damper chamber R13 is formed using the annular shim 124 between the lower end surface of the stationary element 13 and the top surface of the movable element 18, and the fixed throttle may be formed as one or two portions where the annular shim 124 does not overlap the communication grooves 22. That is, the fixed throttle may be formed by making one or two parts of the upper end openings of the communication grooves 22 to open within the internal wall surface 124$a$ of the annular shim 124. For example, the fixed throttles are formed by providing apertures S, S between the lower end edge of the internal wall surface 124$a$ of the annular shim 124 and the upper end openings of the communication grooves 22 of the movable element 18.

In this case, when the movable element 18 excited by the electromagnetic coil 17 is moved to come close to the stationary element 13, the operating fluid within the damper chamber R13 is discharged through the clearance between the lower end surface of the stationary element 13 or the top surface of the movable element 18 and the annular shim 124 and through the portions where the annular shim 124 does not overlap the communication grooves 22, namely, the apertures S, S. With this configuration, the same functions and advantages as those in the foregoing embodiment can be achieved, and in addition, the configuration can be simplified thereby to reduce the manufacturing cost because there can be saved time and labor in implementing the machining such as forming the dent groove 26 on the movable element 18, providing the engaging claws 25 on the annular shim 24 or the like.

Further, in the foregoing second embodiment, instead of providing the annular shim 124, an annular convex portion corresponding to the shim 124 may be provided on the lower surface of the stationary element 13. In this modified case, when the movable element 18 is brought into contact with the stationary element 13, the damper chamber R13 is closed by the lower end surface of the stationary element 13 and the top surface of the movable element 18, in which state the fixed throttle is defined by the lower end edge of the internal wall surface of the annular convex portion and the upper end openings of the communication grooves 22, i.e., by the apertures S, S.

(Third Embodiment)

Next, the third embodiment according to the present invention will be described with reference to FIGS. 7 and 8. The same elements as those in the first embodiment are given the same reference numerals and therefore, are omitted from further description for the sake of brevity.

In the foregoing first embodiment, the annular shim 24 is interposed between the lower end surface of the stationary element 13 and the top surface of the movable element 18, and the dent groove 26 is provided on the top surface of the movable element 18. Further, the damper chamber R3 is defined using the annular shim 24 between the lower end surface of the stationary element 13 and the top surface of the movable element 18, and the fixed throttle is constituted in the form of the dent groove 26. In place of these configurations, in the second embodiment, as shown in FIGS. 7 and 8, an annular convex portion 224 is provided to define a closed wall at the top surface circumferential edge portion of the movable element 18, and a dent groove 224a is formed at a part in the circumferential direction on the annular convex portion 224. The dent groove 224a radially extends across the annular convex portion 224 and makes a dent portion or space, encircled by the annular convex portion 224, communicate with one of the communication grooves 22, 22. Thus, a damper chamber R23 is defined as the dent portion or space encircled by the annular convex portion 224, and a fixed throttle is defined by the dent groove 224a. In this case, the dent groove 224a may be provided to open directly to one of the communication grooves 22, as shown in FIG. 8, or it may be provided at a portion which is any place in the circumferential direction on the annular convex portion 224 and to which it does not open.

In this third embodiment, when the movable element 18 excited by the electromagnetic coil 17 is moved to come close to the stationary element 13, the operating fluid within the damper chamber R23 is discharged into the communication grooves 22 through the clearance between the lower end surface of the stationary element 13 and the annular convex portion 224 and through the dent groove 224a. In this manner, the same functions and advantages as those in the foregoing embodiment can be achieved only by providing the annular convex portion 224 with the dent groove 224a, and in addition, the number of the parts and hence, the manufacturing cost can be reduced since a discrete annular shim is no longer required. In a modification, the annular convex portion 224 may be provided at the lower surface of the stationary element 13 instead of being provided on the top surface of the movable element 18, or two annular convex portions 224 may be provided at both of the top surface of the movable element 18 and the lower end surface of the stationary element 13.

Moreover, the shim 24 (124) used in the foregoing embodiments may be a thin spacer or may be substituted by a gasket or the like as the case may be, and therefore, the term "shim" used herein encompasses these equivalents in the meaning thereof. Further, the dent groove 26, 224a may be a dent, depression, cutout or the like defined by casting, press forming, machining or any other forming measures.

Finally, various features and the attendant advantages of the foregoing embodiments will be summarized as follows:

In a first aspect of the foregoing embodiments as shown in FIGS. 1 to 4 for example, a closed wall 24 (124, 224) is provided on at least one of the a stationary element end surface of the stationary element 13 facing the movable element 18 and a movable element end surface of the movable element 18 facing the stationary element 13 for defining a damper chamber R3 (R13, R23) therein. A fixed throttle 26 (S, 224a) is formed for making the damper chamber R3 (R13, R23) to communicate with the communication groove 22 when the stationary element end surface and the movable element end surface close the damper chamber R3 (R13, R23) as a result of the movable element 18 excited by the electromagnetic coil 17 being moved toward the stationary element 13.

Therefore, when the movable element 18 is coming close to the stationary element 13, the path area which makes the damper chamber R3 communicate with the communication groove 22 is decreased thereby to increase the throttle resistance and to decrease the moving speed of the movable element 18 as the same comes close to the stationary element 13. Thus, the operation noise which is generated when the movable element 18 is brought into contact with the stationary element 13 can be sufficiently diminished. Further, when the movable element 18 is far from the stationary element 13, the clearance is kept large between the stationary element 13 end surface or the movable element 18 end surface and the closed wall (e.g., annular shim 24). Thus, the operating fluid within the damper chamber R3 (R13, R23) is able to be discharged therefrom and charged thereinto without being substantially throttled, so that the movable element 18 can move at a high responsiveness.

In a second aspect of the foregoing embodiment as shown in FIGS. 2 and 3 for example, an annular shim 24 is interposed between the stationary element 13 end surface and the movable element 18 end surface for defining the damper chamber R3 in an internal surface thereof. Further, the fixed throttle 26 is constituted by a dent groove provided at least one of the stationary element 13 end surface and the movable: element 18 end surface for communication with the communication groove 22. When the movable element 18 excited by the electromagnetic coil 17 comes close to the stationary element 13, the operating fluid within the damper chamber R3 is discharged into the communication groove 22 through the clearance between the stationary element 13 end surface or the movable element 18 end surface and the annular shim 24. Thus, the same functions and advantages as those in the aforementioned first aspect can be attained with a simple construction which employs the annular shim 24 and the dent groove 26.

Figure 5:
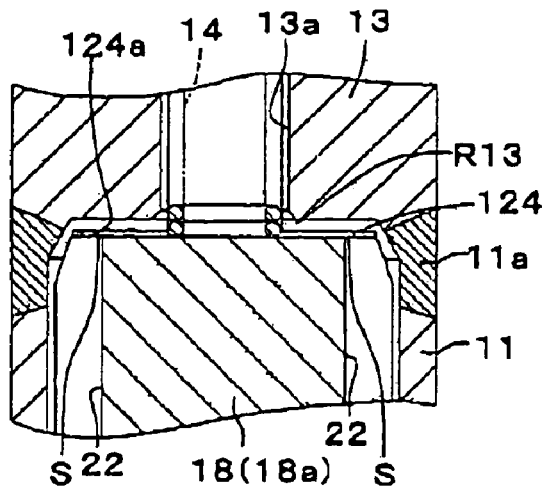
FIG. 5 is an enlarged, fragmentary sectional view of a damper chamber of a normally closed solenoid-operated valve in the second embodiment according to the present invention.
Figure 6:
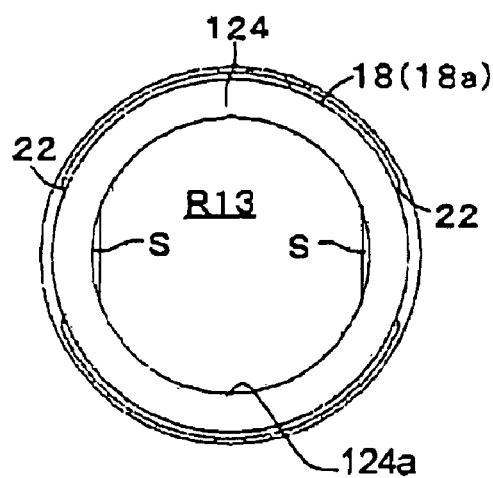
FIG. 6 is an enlarged plan view of a movable element shown in FIG. 5.

In a third aspect of the foregoing embodiment as shown in FIGS. 5 and 6 for example, an annular shim 124 is interposed between the stationary element 13 end surface and the movable element 11 end surface for defining the damper chamber R13 in an internal surface thereof. The fixed throttle is constituted by the portion S where the annular shim 124 does not overlap at least one of the communication grooves 22. When the movable element 18 excited by the electromagnetic coil 17 comes close to the stationary element 13, the operating fluid within the damper chamber R13 is discharged into the communication groove 22 through the clearance between the stationary element 13 end surface or the movable element 18 end surface and the annular shim 24 and through the portion S where the annular shim 124 does not overlap at least one of the communication grooves 22 or where the upper end openings of the communication grooves 22 partly open to the space inside the annular shim 24. Therefore, the same functions and advantages as mentioned earlier can be attained by the provision of the annular shim 124 only.

Figure 7:
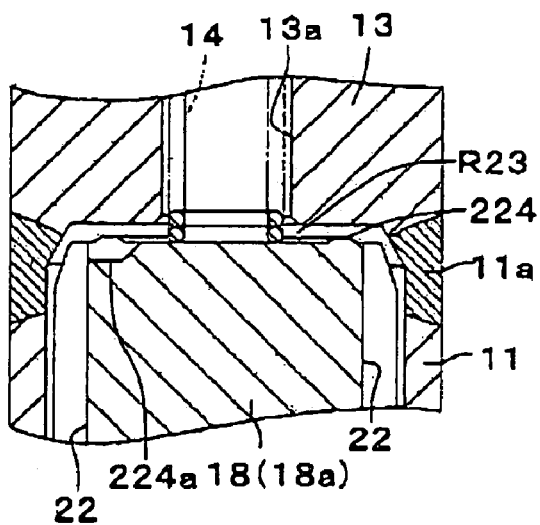
FIG. 7 is an enlarged, fragmentary sectional view of a damper chamber of a normally closed solenoid-operated valve in the third, embodiment according to the present invention.
Figure 8:
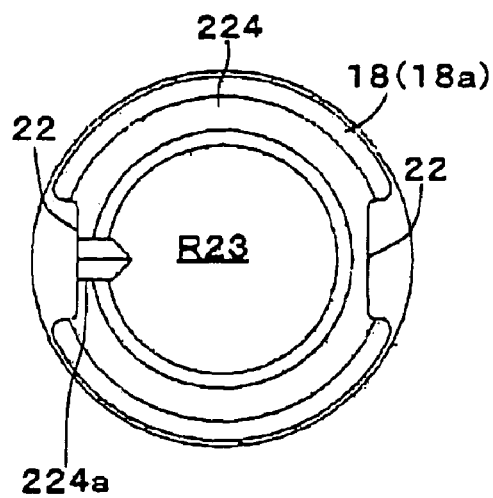
FIG. 8 is an enlarged plan view of a movable element shown in FIG. 7.

In a fourth aspect of the foregoing embodiment as shown in FIGS. 7 and 8 for example, an annular convex portion 224 is formed on at least one of the stationary element 13 end surface and the movable element 18 end surface for defining the closed wall encircled by the annular convex portion 224 with the damper chamber R23 therein, and the fixed throttle is formed by a dent groove 224a provided on the annular convex portion 224 radially across the same to communicate with the communication groove 22. When the movable element 18 excited by the electromagnetic coil 17 comes close to the stationary element 13, the operating fluid within the damper chamber R23 is discharged into the communication groove 22 through the clearance between the stationary element 13 end surface or the movable element 18 end surface and the annular convex portion 224. Therefore, the same functions and advantages as mentioned earlier can be attained by the provision of the annular convex portion 224 only.

Obviously, numerous modifications and variations of the present invention are possible in light of the above teachings. It is therefore to be understood that within the scope of the appended claims, the present invention may be practiced otherwise than as specifically described herein.

What is claimed is:

1. A normally closed solenoid-operated valve having a cylindrical sleeve; a stationary element provided at one end of said sleeve; a movable element slidably inserted in said sleeve to face said stationary element and provided at an external surface thereof with a communication groove which axially extends between axial opposite ends thereof for permitting the flow of operating fluid; and an electromagnetic coil for exciting said stationary element and said movable element; said solenoid-operated valve comprising:

a closed wall provided on at least one of a stationary element end surface of said stationary element facing said movable element and a movable element end surface of said movable element facing said stationary element for defining a damper chamber therein; and a fixed throttle for making said damper chamber to communicate with said communication groove when said stationary element end surface and said movable element end surface close said damper chamber as a result of said movable element excited by said electromagnetic coil being moved toward said stationary element.

2. The solenoid-operated valve as set forth in claim 1, wherein said closed wall is constituted by an annular shim which is interposed between said stationary element end surface and said movable element end surface for defining said damper chamber in an internal surface thereof; and wherein said fixed throttle is constituted by a dent groove provided at least at one of said stationary element end surface and said movable element end surface for communication with said communication groove.

3. The solenoid-operated valve as set forth in claim 2, wherein said dent groove is in communication with said communication groove through a clearance around said movable element end surface.

4. The solenoid-operated valve as set forth in claim 1, wherein said closed wall is constituted by an annular shim which is interposed between said stationary element end surface and said movable element end surface for defining said damper chamber in an internal surface thereof; and wherein said fixed throttle is constituted by a part where said annular shim does not overlap said communication groove.

5. The solenoid-operated valve as set forth in claim 1, wherein said closed wall is constituted by an annular shim which is interposed between said stationary element end surface and said movable element end surface for defining said damper chamber in an internal surface thereof; and wherein said fixed throttle is constituted by a part of one end of said communication groove which part opens to said damper chamber within the internal surface of said close wall.

6. The solenoid-operated valve as set forth in claim 1, wherein said closed wall is constituted by an annular convex portion formed on at least one of said stationary element end surface and said movable element end surface for defining a dent portion encircled by said annular convex portion as said damper chamber; and wherein said fixed throttle is formed by a dent groove provided across said annular convex portion to make said dent portion communicate with said communication groove.

7. The solenoid-operated valve as set forth in claim 6, wherein said dent groove directly opens to said communication groove.

* * * * *